May 28, 1968 B. SCHAFER 3,385,098
DEW POINT MEASURING APPARATUS
Filed Aug. 31, 1966 2 Sheets-Sheet 1
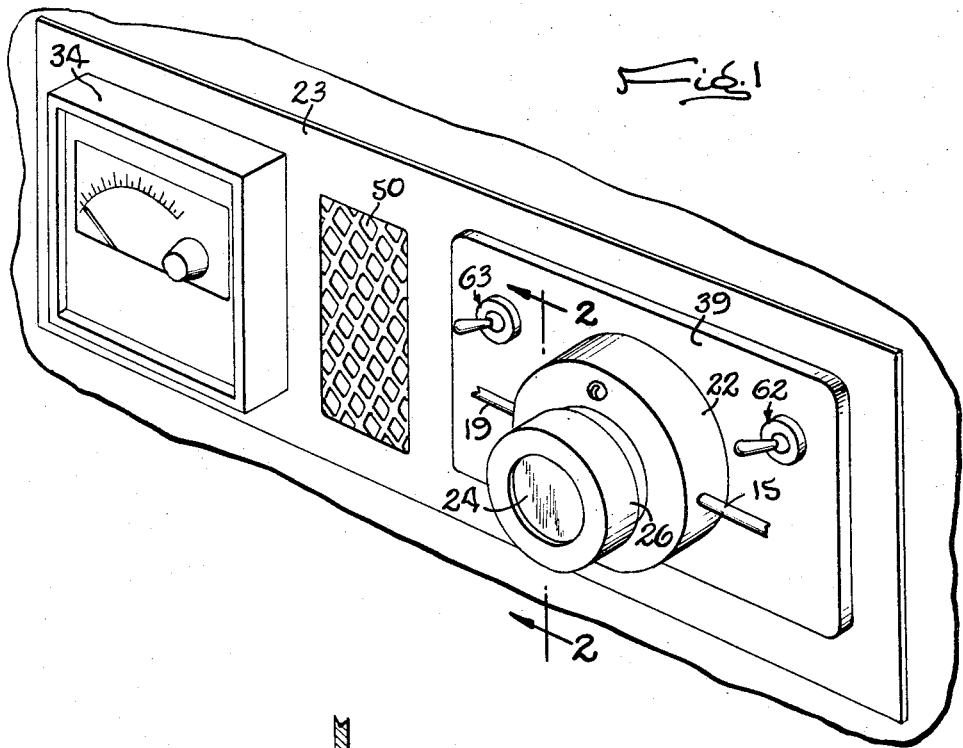
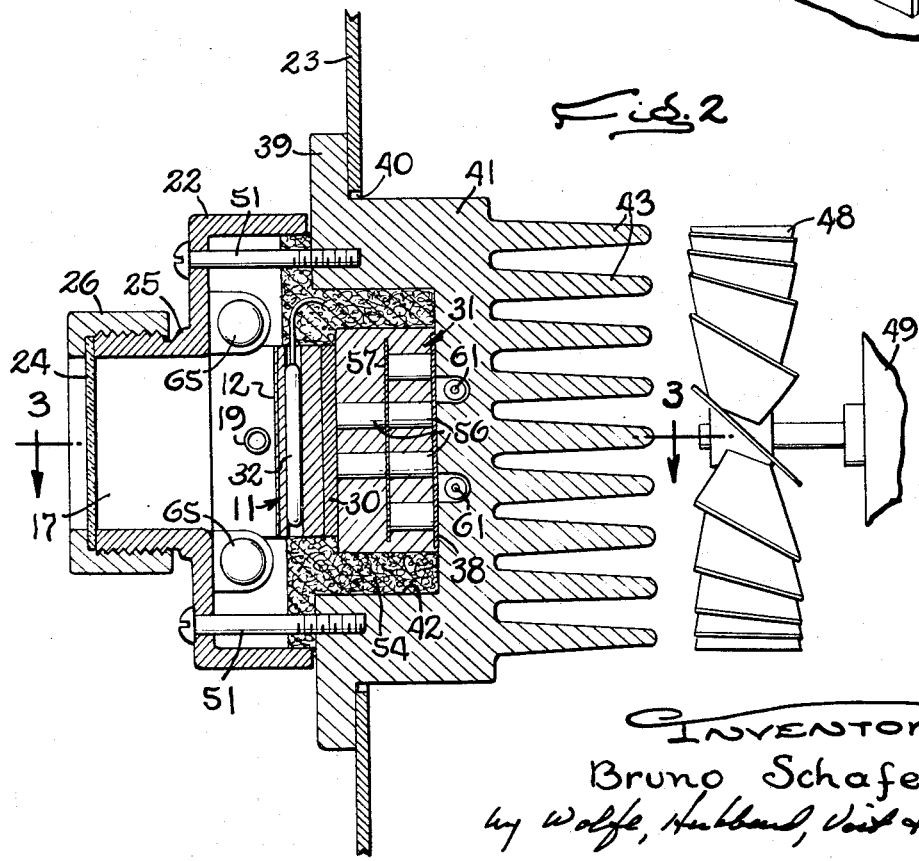
INVENTOR
Bruno Schafer
by Wolfe, Hubbard, Voit & Osann
ATTORNEY

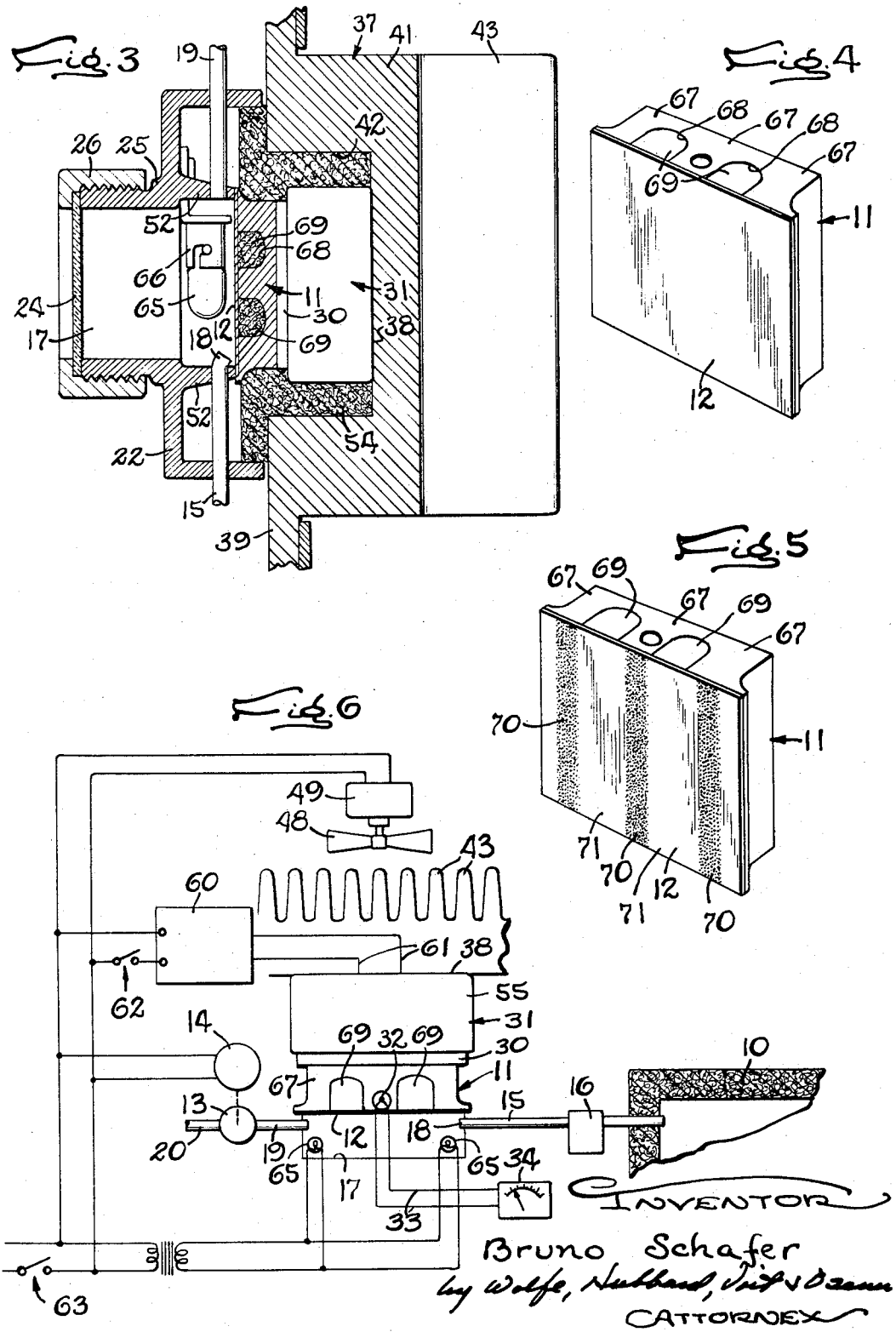

United States Patent Office 3,385,098
Patented May 28, 1968

3,385,098
DEW POINT MEASURING APPARATUS
Bruno Schafer, Ludwigsburg, Germany (% Ipsen Industries, Inc., P.O. Box 500, Rockford, Ill. 61105)
Filed Aug. 31, 1966, Ser. No. 576,397
Claims priority, application Germany, Sept. 7, 1965, Sch 37,688
7 Claims. (Cl. 73—17)

This invention relates to an apparatus for measuring the dew point temperature of a gas such as the atmosphere in a furnace chamber and, more particularly, to an instrument of the type in which the dew point is determined by withdrawing a sample of the gas from the chamber, directing the gas sample against a collector which is cooled progressively by a cooling unit until the prevailing dew point temperature is reached and moisture from the sample condenses on and clouds the surface of the collector, and measuring the temperature at which the collector becomes cloudy.

The primary object of the present invention is to provide a new and improved instrument of the above character in which the fog on the collecting surface caused by condensation is more clearly perceptible than in prior devices and is distinguished more easily from clouding caused by impurities and contaminants in the gas thereby enabling a more precise determination of the dew point temperature.

A more detailed object is to achieve the foregoing by forming the collector with a series of alternating lands and grooves and establishing good heat transfer only between the lands and the cooling unit so that the gas condenses more rapidly on the cooler zones of the collecting surface overlying the lands and the resulting fog contrasts in appearance with the clearer and warmer zones overlying the grooves.

Other objects and advantages of the invention will become apparent from the following detailed description taken in connection with the accompanying drawings, in which FIGURE 1 is a fragmentary perspective view of an apparatus embodying the novel features of the present invention.

FIG. 2 is an enlarged fragmentary cross-sectional view taken substantially along the line 2—2 of FIG. 1.

FIG. 3 is a fragmentary cross-sectional view taken substantially along the line 3—3 of FIG. 2.

FIG. 4 is a fragmentary perspective view showing the collector in a clear condition.

FIG. 5 is a view similar to FIG. 4 showing the collector in a fogged or cloudy condition.

FIG. 6 is a schematic view and circuit diagram of the apparatus.

As shown in the drawings for purposes of illustration, the invention is embodied in an improved apparatus for measuring the dew point temperature of the atmosphere in a furnace 10 (FIG. 6) by withdrawing a sample flow of gas from the interior of the furnace, directing the gas against a collector 11 which is cooled progressively from a temperature above the dew point until moisture condenses on the collecting surface 12 of the collector, and measuring the temperature at which the moisture condenses. This temperature is the prevailing dew point of the furnace atmosphere.

The importance of the dew point temperature is well known in the art. In the heat treating of metals surrounded by endothermic atmosphere, the chemical composition of the atmosphere determines whether the atmosphere will be reducing, neutral or oxidizing with respect to the metal being treated. Moreover, the chemical constituents of the atmosphere vary proportionately with the amount of water vapor in the atmosphere. Thus, by measuring the dew point, the chemical composition of the atmosphere can be determined. By controlling the dew point, the chemical composition can be controlled.

As disclosed in Patent No. 2,815,305, the dew point readings obtained with measuring systems can be used to control a valve (not shown) in a supply line through which a variable flow of dew point control gas is admitted into the furnace 10 to maintain a a desired equilibrium therein, for example, to maintain a preselected carbon potential for a carburizing action. Whenever the dew point varies from a value corresponding to the desired balance in the furnace atmosphere, the valve is opened or closed automatically as required to increase or decrease the flow of secondary gas. In a less complex system, the dew point reading may be determined visually and the valve opened and closed manually by an attendant.

In the illustrative system, the sample gas is withdrawn from the furnace 10 (FIG. 6) by a vacuum pump 13 driven by an electric motor 14 and having an intake communicating with the interior of the furnace through a pipe 15 and a filter 16 for removing certain contaminants from the sample. The pipe leads to a sampling chamber 17 (FIG. 3) and terminates in a nozzle 18 positioned to direct a stream or jet of gas against the collecting surface 12 of the collector 11 which is disposed within the chamber. Between the furnace and the chamber, the sample gas is cooled to a substantially uniform temperature, preferably by cooling fins (not shown) on the pipe 15 presenting a large surface area for dissipation of heat. The gas is removed from the chamber through a pipe 19 connected to the input of the pump and is exhausted through a pipe 20 communicating with the pump output.

Herein, the sampling chamber 17 is defined by a cup-shaped casing 22 of cylindrical cross-section mounted on the front of a box-like cabinet 23 (FIG. 1) housing the components of the instrument. The rear or inner end of the chamber is closed by the collector 11 and the front end is closed by a circular glass window 24 disposed against the end of an externally threaded sleeve 25 formed integrally with the casing. An open-end cap 26 threaded over the sleeve maintains the window in place and establishes a gas-tight seal between the window and the end of the sleeve.

As shown in FIGS. 2 to 4, the collector 11 comprises a substantially rectangular block of conductive metal such as copper and is mounted in the chamber 17 with its inner end disposed adjacent the outer or cooling end 30 of a thermoelectric cooler 31. Embedded in the collector is a Copper-Constantan thermocouple 32 (FIG. 2) for sensing the temperature of the collector and producing a voltage signal corresponding to the sensed temperature. The thermocouple is connected by conductors 33 to a meter 34 mounted in the cabinet 23 thus enabling a visual indication of the temperature of the collector.

In operation, the cooling unit 31 is activated and cools the collector 11 progressively until the prevailing dew point temperature is reached and moisture from the gas sample in the chamber 17 condenses on the collector. The condensation collects on and clouds the collecting surface 12 which is highly polished and reflective so that an attendant, by looking through the window 24, can detect when the dew point has been reached and can determine the dew point temperature by reading the meter 34.

In this instance, the cooling unit 31 is disposed between the collector 11 and a heat transfer member 37 set into the front wall of the cabinet 23 with the heat discharge side 38 of the cooling unit in heat-conducting relation with the member 37. Herein, the latter is an aluminum casting formed with a generally rectangular front plate 39 covering an opening 40 in the cabinet wall, and with an inwardly projecting case 41 defining a recess 42 in which the collector and the cooling unit are mounted. Formed integrally with the rear wall of the case is a plurality of flat vertically spaced fins 43 disposed within the interior of the cabinet to present a substantial surface area for rapid dissipation of heat from the casting. To assist in the dissipation of excess heat in the heat sink 37, a fan 48 (FIGS. 2 and 6) mounted in the cabinet behind the heat sink and driven by an electric motor 49 draws a continuous flow of outside air into the cabinet and forces the air over the fins and then out of the cabinet through a screened outlet 50 (FIG. 1) in the front wall of the cabinet. This prevents overheating of the heat sink and the components in the cabinet and maintains the heat sink at an approximate temperature level somewhat above room temperature.

To hold the components of the instrument in assembled relation, a pair of screws 51 (FIGS. 1 and 2) extend through the casing 22 and are threaded into the front plate 39 of the heat sink 37. A pair of parallel ribs 52 depending from the interior walls of the casing abut against the edge portions of the collecting surface 12 of the collector 11 to hold the latter against the cooling unit 31. The space around the components is filled with foam material 54.

The term "thermoelectric cooler," as used herein, means a unit which cools by thermoelectric action, that is, in which the passage of current through the unit results in the absorption of heat at one end and the evolution of heat at the other. A specific embodiment of such a device is that which utilizes the Peltier effect produced by current passing across two junctions between dissimilar metals, current being passed across the junctions in appropriate directions to absorb heat at one junction and give up heat at the other. A commercial form of the device is the Thermoelectric Cascade Module sold by Scientific Columbus, Columbus, Ohio, as Model 3082.

The cooling unit 31 is housed in a metal container 55 with its discharge end 38 pressed against the heat sink 37. The cooling unit includes a plurality of semiconductor cooling elements or pillars 56 (shown schematically in FIG. 2) arranged in two end-to-end layers with the pillars of one layer extending rearwardly from the front end of the container 55 half way through the container and abutting against the adjacent side of an intermediate sheet 57 of heat conducting material. The pillars of the other layer extend rearwardly from the opposite side of the sheet to the rear end of the container. In each pillar, the heat absorbing junction is at the front end and the heat-discharging junction is at the rear or inner end. Thus, the front layer cools the collector 11 and gives up heat to the intermediate sheet 57 which, in turn, is cooled by the rear layer. The heat discharged by the rear layer at the rear or discharge end of the unit is conducted into the heat sink 37. Because of the inefficiency of the cooling pillars, the amount of heat discharged by each pillar is much greater than that absorbed, and the cooling load at the intermediate sheet is substantially greater than the load at the collector. For this reason, the rear layer contains a greater number of pillars, preferably four times as many.

The current for energizing the cooler 31 is supplied by a suitable direct current source 60 (FIG. 6) through insulated conductors 61 extending through passages in the heat sink 37 as shown in FIG. 2, the activation of the source being controlled by a switch 62 mounted on the front wall of the cabinet 23. A second switch 63 mounted on the front wall controls the pump motor 14 and the fan motor 49. By closing the cooling switch 62, the cooler may be activated to remove heat from the collector 11 and thus cause the gas to condense on and cloud the collecting surface 12. A pair of lamps 65 (FIG. 3) mounted in sockets 66 fastened within the casing 22 illuminate the collecting surface to aid in visually detecting the formation of the condensate on the collecting surface.

The precision with which the dew point can be determined depends largely on the ability of the attendant to observe exactly when the condensate starts to form on the collecting surface 12. A clear observation of the beginning of this process is difficult, however, because of the individual characteristics of the attendant and because certain gases contain mechanical contaminations which will cloud the collecting surface much in the same way as the formation of the condensate.

In accordance with the present invention, the collector 11 is constructed in a novel manner such that the fog on the collecting surface 12 caused by condensation is more clearly perceptible than in prior devices and is distinguished more clearly from clouding caused by impurities and contaminants in the gas thereby enabling a more precise and accurate determination of the dew point temperature. To these ends, the collector is formed with alternating lands 67 and grooves 68, the former being in good heat transfer relation with the cooling unit 31 and the latter insulating zones of the collecting surface from the cooling unit. Thus, when the cooling unit is activated, the gas condenses more rapidly on the cooler zones of the collecting surface overlying the lands so that the fog produced on these zones contrasts in appearance with the warmer insulated zones overlying the grooves. As a result, the attendant can see the contrast quite easily and can determine exactly when the condensate begins to form in order to ascertain the dew point temperature.

In the present instance, a pair of parallel grooves 68 are formed in the collector 11 and are disposed between a series of three lands 67 extending parallel to the grooves. As shown most clearly in FIG. 3, the lands are disposed closely adjacent the collecting surface 12 while the surfaces of the grooves are spaced relatively far away from the collecting surface 12. In addition, segments 69 of thermal insulating material fitted within the grooves insulate zones of the collecting surface overlying the grooves from the cooler 31. With this arrangement, the zones 70 (FIG. 5) of the collecting surface 12 overlying the lands are in better heat transfer relation with the cooler and are cooled more rapidly than the zones 71 overlying the grooves and the insulator segments.

From the foregoing, it will be seen that the collecting surface 12 is relatively clear (FIG. 4) when the cooler 31 is deenergized. Then, as the attendant closes the switch 62 and activates the cooler, the zones 70 cool quite rapidly and collect moisture when the prevailing dew point temperature is reached. Because the zones 71 overlying the insulator segments 69 are cooled more slowly, they remain clear and thus the collecting surface becomes gridlike in appearance as shown in FIG. 5. As a result, the attendant can detect the contrasting image without difficulty and can determine the temperature of the collecor 11 and thus the dew point of the gas at the exact instant the image appears. Of course, moisture eventually will collect on the warmer zones 71 upon continued cooling of the collector.

When the cooler 31 is deenergized, a portion of the heat stored in the heat sink 37 simply is conducted back through the cooler to the collector 11 at a rate determined by the heat conductivity of the components of the cooler. The warming effect of the conducted heat combines with the lesser warming effect of the sample gas from the nozzle 18 to evaporate the condensate. Evaporation takes place first in the zones 70 overlying the lands 67 so that these zones become clear and an image opposite in appearance to that shown in FIG. 5 is produced on the collecting surface 12. As the clear and cloudy lines become approximately equal in width, the temperature of the collector may be read on the meter 34 to provide another determination of the dew point temperature.

I claim as my invention:

1. In an apparatus for measuring the dew point of a gas, the combination of, a collector having a moisture collecting surface on one side thereof, means for directing a flow of gas against said collecting surface, a thermoelectric cooler having a cooling side disposed adjacent the opposite side of said collector and being operable to remove heat from said collector to condense the moisture in the gas on said collecting surface, means between said cooling side and said collecting surface defining a series of grooves and a series of lands alternating with the grooves, said lands being disposed in heat-transferring relation with said cooling side and with spaced zones of said collecting surface overlying the lands, and thermal insulation disposed within said grooves to insulate zones of said collecting surface overlying the grooves from said cooling side whereby moisture in the gas condenses more rapidly on the zones of the collecting surface overlying the lands than on the insulated zones to present a contrasting appearance on the collecting surface.

2. A measuring apparatus as defined in claim 1 in which said grooves and said lands extend parallel to each other.

3. A measuring apparatus as defined in claim 1 further including means on said collector for sensing the temperature of the latter, and mechanism responsive to said sensing means for indicating the temperature of said collector.

4. A measuring apparatus as defined in claim 3 in which said collector comprises a plate of conductive metal, and said sensing means comprises a thermocouple embedded in said plate.

5. A measuring apparatus as defined in claim 1 in which said cooler has a discharge side spaced from said collector, and further including a heat-transfer member in heat-conducting relation with said discharge side to receive heat from the latter.

6. A measuring apparatus as defined in claim 5 further including a fan for circulating cooling atmosphere across said member to remove heat therefrom.

7. In an apparatus for measuring the dew point of a gas, the combination of, a collector having a moisture collecting surface on one side thereof, means for directing a flow of gas against said collecting surface, a cooling element disposed adjacent the opposite side of said collector and operable to cool the latter to condense the moisture in the gas on said collecting surface, said collector being formed with a pair of lands and with a groove located between said lands, said collecting surface overlaying said groove, said lands being disposed in heat-transferring relation with said cooling element and with spaced zones of said collecting surface overlying the lands, and thermal insulation disposed within said groove to insulate a zone of said collecting surface overlying the groove from said cooling element whereby the moisture in the gas condenses more slowly on the insulated zone than on the other zones to present a contrasting appearance on the collecting surface.

References Cited
UNITED STATES PATENTS 3,269,185   8/1966   Francisco _____ 73—17

LOUIS R. PRINCE, *Primary Examiner.*

DENIS E. CORR, *Assistant Examiner.*